United States Patent [19]

Kast et al.

[11] 4,223,144
[45] Sep. 16, 1980

[54] TRIPHENYLMETHANE DYES

[75] Inventors: Hellmut Kast, Bobenheim-Roxheim; Klaus Grychtol, Bad Durkheim; Franz Feichtmayr, Ludwigshafen, all of Fed. Rep. of Germany

[73] Assignee: BASF Aktiengesellschaft, Ludwigshafen, Fed. Rep. of Germany

[21] Appl. No.: 939,695

[22] Filed: Sep. 5, 1978

[30] Foreign Application Priority Data

Sep. 5, 1977 [DE] Fed. Rep. of Germany ....... 2739953

[51] Int. Cl.² .................................... C07D 295/12
[52] U.S. Cl. .................................... 544/392; 260/391; 260/326.25; 260/326.41; 260/326.5 L; 260/326.85; 544/78; 544/82; 544/108; 544/357; 544/393; 544/395; 546/186; 546/246; 546/247; 542/417
[58] Field of Search ............... 544/392, 357, 393, 395, 544/78, 82, 108; 260/391, 326.25, 326.41, 326.5 L, 326.85; 542/414, 417; 546/186, 246, 247

[56] References Cited

U.S. PATENT DOCUMENTS 3,705,913  12/1972  Fox et al. ............................. 260/391
3,828,071  8/1974   Kast et al. ............................ 260/391

Primary Examiner—Jose Tovar

Attorney, Agent, or Firm—Oblon, Fisher, Spivak, McClelland & Maier

[57] ABSTRACT

Compounds of the general formula I

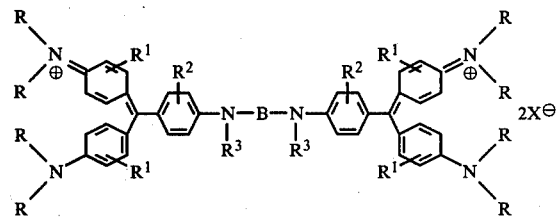

where
B is a bridge member,
the radicals R independently of one another are hydrogen or substituted or unsubstituted alkyl, or two radicals R together with the nitrogen are a heterocyclic saturated 5-membered or 6-membered ring,
the radicals $R^1$ independently of one another are hydrogen or $C_1$–$C_4$-alkyl,
the radicals $R^2$ independently of one another are hydrogen, $C_1$–$C_4$-alkyl or halogen,
the radicals $R^3$ independently of one another are hydrogen or substituted or unsubstituted alkyl or together are an alkylene group, and $X^\ominus$ is an anion. The compounds of the formula I are particularly suitable for dyeing paper.

8 Claims, No Drawings

TRIPHENYLMETHANE DYES

The present invention relates to a compound of the general formula I

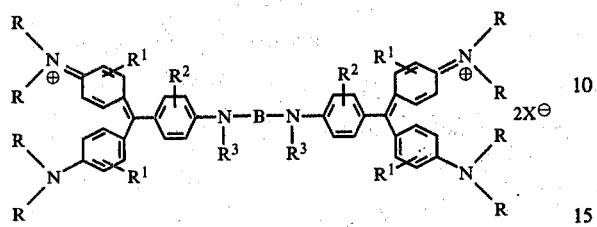

where
B is a bridge member;
the radicals R independently of one another are hydrogen or substituted or unsubstituted alkyl, or two radicals R together with the nitrogen are a heterocyclic saturated 5-membered or 6-membered ring,
The radicals $R^1$ independently of one another are hydrogen or $C_1$-$C_4$-alkyl,
the radicals $R^2$ independently of one another are hydrogen, $C_1$-$C_4$-alkyl or halogen,
the radicals $R^3$ independently of one another are hydrogen or substituted or unsubstituted alkyl or together are an alkylene group, and
$X^\ominus$ is an anion.

The radicals R may be identical or different; they are, as a rule, of 1 to 8 carbon atoms and may be substituted by, for example, hydroxyl, $C_1$-$C_4$-alkoxy, $C_1$-$C_4$-alkanoyloxy, $C_1$-$C_4$-alkoxycarbonyl, cyano, chlorine, acetyl, acetylamino or phenyl. The same applies to radicals $R^3$.

Specific examples of such radicals are $CH_3$, $C_2H_5$, $C_3H_7$, $C_4H_9$, $C_5H_{11}$, $C_6H_{13}$, $C_8H_{17}$, $C_2H_4OH$, $CH_2CHOHCH_3$, $CH_2CH_2OCH_3$, $CH_2CH_2OC_2H_5$, $CH_2CH_2OC_4H_9$, $$CH_2CHCH_3 \atop OCH_3$$

$CH_2CH_2OCOCH_3$, $CH_2CH_2OCOC_2H_5$, $CH_2CH_2COOCH_3$, $CH_2CH_2COOC_4H_9$, $CH_2CH_2CN$, $CH_2CH_2Cl$, $CH_2CH_2COCH_3$, $CH_2CH_2CH_2NHCOCH_3$ and $CH_2C_6H_5$.

Examples of cyclic radicals

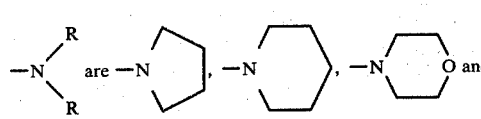

Preferred radicals R are hydrogen, methyl and ethyl.
$R^1$ is preferably hydrogen or, if it is alkyl, methyl.
$R^2$ is preferably hydrogen, chlorine, or, if it is alkyl, methyl.
For $R^3$ $C_1$ to $C_4$ alkyl, particularly methyl or ethyl, are preferred.
Particularly suitable bridge members B are radicals of the formula $-(CH_2)_n-$, $-CH_2-Ar-CH_2-$,

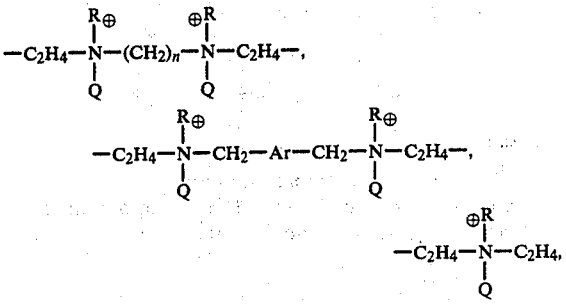

and $-C_2H_4OCONH-Ar-NHCOOC_2H_4-$, where Ar is phenylene, diphenylene or naphthylene which are unsubstituted or substituted by chlorine, methyl or methoxy, n is a number from 2 to 8, Q is methyl, ethyl or benzyl and R has the stated meaning.

The portion

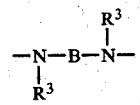

of the molecule may also be the preferred radical

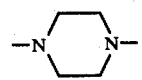

A compound of the formula I can be manufactured by reacting a compound of the formula II

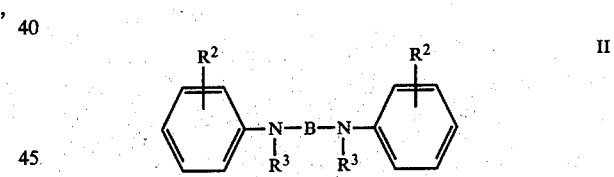

with a compound of the formula III

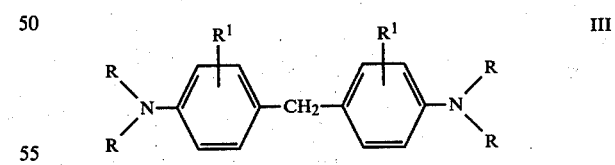

under oxidizing conditions, for example by the methods described in German Pat. No. 2,152,703, German Published Application DAS No. 2,334,918 and German Laid-Open Application DOS No. 2,427,606. The reactions do not exhibit any peculiarities compared to the processes described in the said publications, and take place in a similar manner to the said processes.

A further method of manufacturing a compound of the formula I is to condense a compound of the formula II with a compound of the formula IV

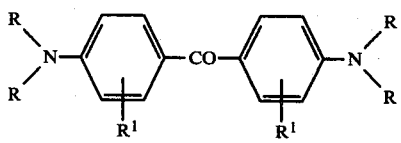

for example by conventional methods.

A compound of the formula II may be obtained by reacting a compound of the formula Hal—B—Hal with a compound of the formula

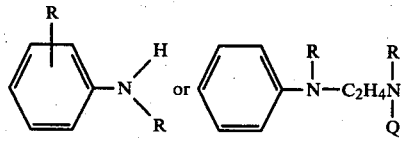

by conventional methods. A compound of formula II in which the bridge member is

—C₂H₄OCONH—Ar—NHCOOC₂H₄— is obtained by reacting a bis-isocyanate with the corresponding hydroxy compound.

The compounds of the formula I are violet to reddish blue and may be used as basic dyes, especially for dyeing paper, preferably bleached sulfite pulp. The dyes exhibit considerable substantivity and are exhaustively taken up from an aqueous dyeing medium; hence they cause very little pollution of the environment.

Industrially particularly important compounds are those of the formula Ia

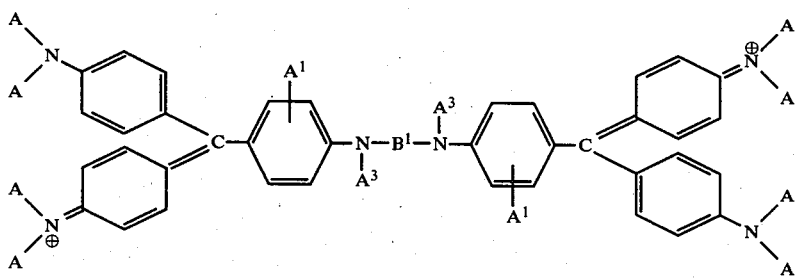

where independently
the radicals A are methyl or ethyl,
A¹ is hydrogen or methyl and
B¹ is —(CH₂)$_p$—,

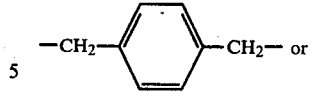

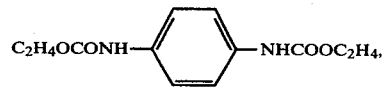

p being a number from 2 to 6,
and the radical

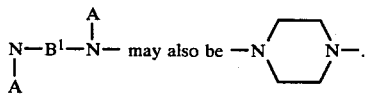

EXAMPLE 1

A mixture of 357 parts of N,N'-diphenylpiperazine, 762 parts of 4,4-bis-dimethylaminodiphenylmethane, 1,460 parts of glacial acetic acid, 10 parts of chloranil and 10 parts of the Fe complex of dihydrodibenzotetraaza[14]annulene is oxidized with 96 parts of oxygen at 40°–50° C., the mixture being stirred vigorously.

About 2,700 parts of a liquid formulation, of about 45% strength, of the dye of the formula

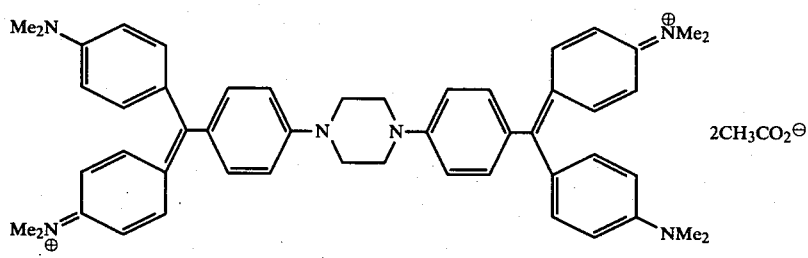

are obtained; the formulation gives a violet dyeing on bleached sulfite pulp.

EXAMPLE 2

A mixture of 508 parts of 4,4'-bis-dimethylaminodiphenylmethane, 344 parts of 1,4-bis-(N-phenyl-N-ethylaminomethyl)-benzene, 1,500 parts of glacial acetic acid, 10 parts of chloranil and 10 parts of the Co complex of dihydrodibenzotetraaza[14]annulene is oxidized at 35°–45° C. by passing air into the mixture, with vigorous stirring, until no further oxygen consumption is noted.

2,500 parts of a liquid formulation, of about 45% strength, of the dye of the formula

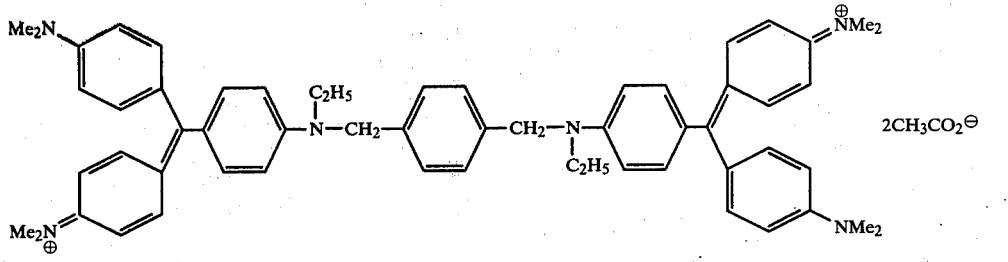

are obtained; the formulation gives a violet dyeing on bleached sulfite pulp.

EXAMPLE 3

A mixture of 508 parts of 4,4'-bis-dimethylaminodiphenylmethane, 372 parts of 1,4-bis-(N-m-tolyl-N-ethylaminomethyl)-benzene, 1,200 parts of glacial acetic acid, 300 parts of propylene glycol, 10 parts of chloranil and 10 parts of the Fe complex of dihydrodibenzotetraaza[14]annulene is oxidized at 35°–45° C. by passing air into the mixture, with vigorous stirring, until no further oxygen consumption is noted.

About 2,400 parts of a liquid formulation, of about 45% strength, of the dye of the formula

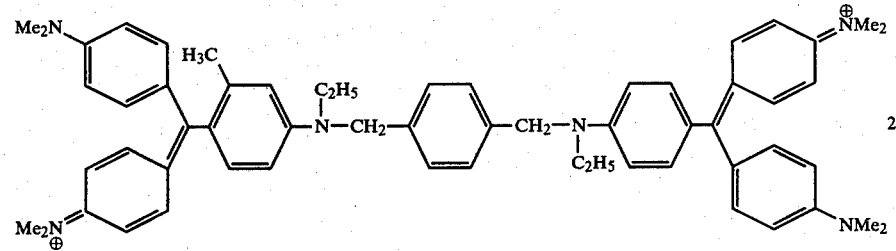

are obtained; the formulation gives a reddish blue dyeing on bleached sulfite pulp.

The Table which follows shows the structure of further dianilines ($H_2B$) which can be oxidized in the presence of 4,4'-bis-dimethylaminodiphenylmethane, by the methods described in Examples 1–3, to give dyes of the formula

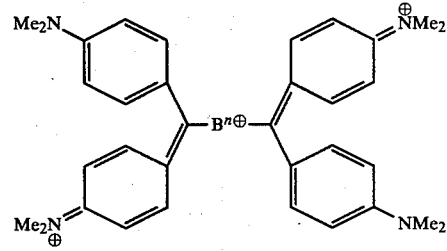

$(n + 2)CH_3CO_2^{\ominus}$
$n = 0 - 2$

| $H_2B$ or $H_2B^{n+}]X_n^{\ominus}$<br>n = 1 and 2 | Hue of the dye on bleached sulfite pulp |
|---|---|
| 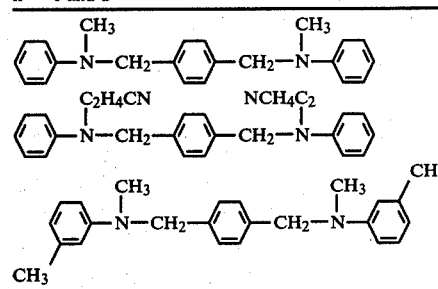 | violet |
| 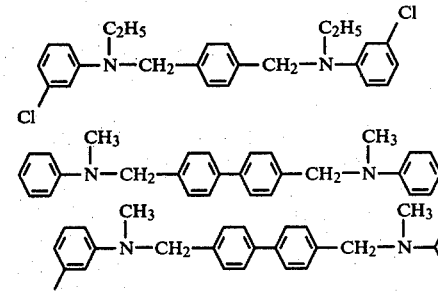 | " |
|  | " |
| | reddish blue |
| | violet |
| | " |

-continued

| H₂B or [H₂Bⁿ⁺]Xₙ⁻    n = 1 and 2 | Hue of the dye on bleached sulfite pulp |
|---|---|
| (C₆H₅)(C₂H₅)N—CH₂—[naphthalene-2,6-diyl]—CH₂—N(C₂H₅)(C₆H₅) | " |
| (C₆H₅)(CH₃)N—C₂H₄—N(CH₃)(C₆H₅) | " |
| (C₆H₅)(C₂H₅)N—C₄H₈—N(C₂H₅)(C₆H₅) | " |
| (C₆H₅)(C₂H₅)N—CH₂—CH=CH—CH₂—N(C₂H₅)(C₆H₅) | " |
| 3-CH₃-C₆H₄—N(piperazine)N—C₆H₄-3-CH₃ | reddish blue |
| (C₆H₅)(C₂H₅)N—C₂H₄—N⁺(CH₃)₂—CH₂—C₆H₄—CH₂—N⁺(CH₃)₂—C₂H₄—N(C₂H₅)(C₆H₅) · 2Cl⁻ | violet |
| (C₆H₅)(C₂H₅)N—C₂H₄—N⁺(CH₃)₂—CH₂—CH₂—N⁺(CH₃)₂—C₂H₄—N(C₂H₅)(C₆H₅) · 2Br⁻ | " |
| (C₆H₅)(C₂H₅)N—C₂H₄—N⁺(CH₃)₂—H₂C—CH=CH—CH₂—N⁺(CH₃)₂—C₂H₄—N(C₂H₅)(C₆H₅) · 2Cl⁻ | " |
| (C₆H₅)(C₂H₅)N—C₂H₄—N⁺(CH₃)(C₂H₄—)—C₂H₄—N(C₂H₅)(C₆H₅) · Cl⁻ | " |
| (C₆H₅)(C₂H₅)N—C₂H₄—N⁺(C₂H₅)₂—C₂H₄—N(C₂H₅)(C₆H₅) · Cl⁻ | " |
| (C₆H₅)(C₂H₅)N—C₂H₄O₂CNH—C₆H₄—NHCO₂C₂H₄—N(C₂H₅)(C₆H₅) | " |
| (C₆H₅)(C₂H₅)N—C₂H₄—N⁺(CH₃)₂—C₄H₈—N⁺(CH₃)₂—C₂H₄—N(C₂H₅)(C₆H₅) · 2Cl⁻ | " |
| 3-Cl-C₆H₄—N(piperazine)N—C₆H₄-3-Cl | reddish blue |
| (C₆H₅)(C₂H₅)N—C₂H₄—N⁺(C₂H₅)₂—CH₂—C₆H₄—CH₂—N⁺(C₂H₅)₂—C₂H₄—N(C₂H₅)(C₆H₅) | violet |

EXAMPLE 4

A mixture of 282 parts of 4,4′-bis-ethylamino-3,3′-dimethyldiphenylmethane, 238 parts of N,N′-diphenylpiperazine, 800 parts of glacial acetic acid, 5 parts of chloranil and 5 parts of the Fe complex of dihydrodibenzotetraaza[14]annulene is oxidized with air at 40°–50° C. until no further oxygen uptake is observed.

About 1,350 parts of a liquid formulation, of about 40% strength, of the dye of the formula

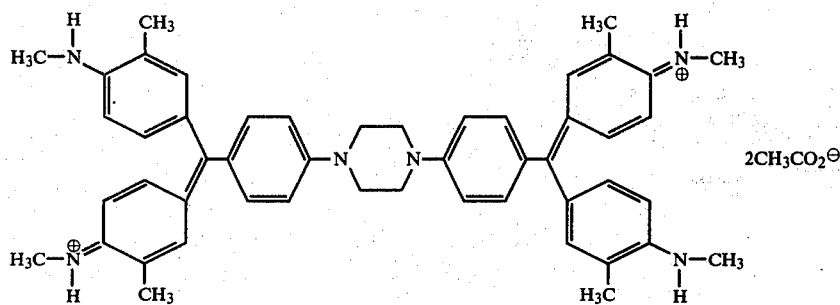

are obtained; the formulation gives a reddish violet dyeing on bleached sulfite pulp.

EXAMPLE 5

A mixture of 310 parts of 4,4'-bis-diethylaminodiphenylmethane, 238 parts of N,N'-diphenylpiperazine, 600 parts of glacial acetic acid, 200 parts of propylene glycol, 5 parts of chloranil and 5 parts of the Fe complex of dihydrodibenzotetraaza[14]annulene is oxidized with 64 parts of oxygen at 40°–50° C.

About 1,380 parts of a liquid formulation, of about 40% strength, of the dye of the formula

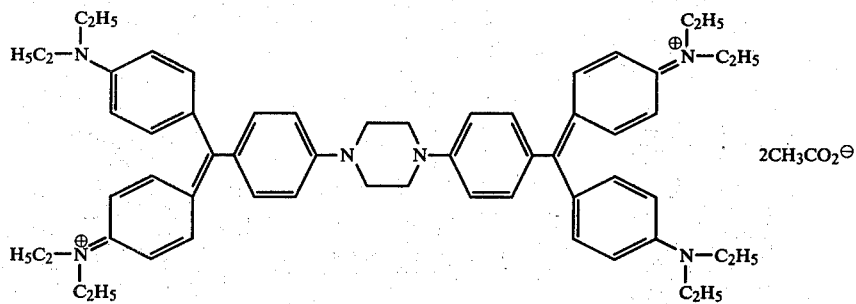

are obtained; the formulation gives a violet dyeing on bleached sulfite pulp.

We claim:

1. A triphenylmethane dye of the general formula:

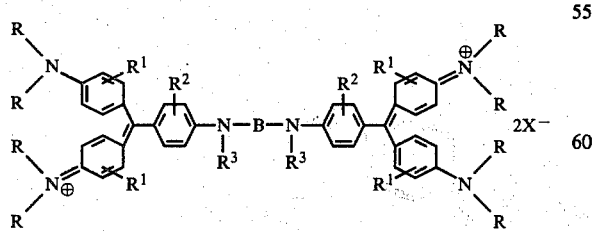

wherein radical R each independently are hydrogen or substituted or unsubstituted alkyl, or the two R radicals together with the nitrogen atom form a saturated heterocyclic 5-membered or 6-membered ring; radicals $R^1$ each independently are hydrogen or $C_1$–$C_4$ alkyl; radicals $R^2$ each independently are hydrogen, $C_1$–$C_4$ alkyl or halogen; radicals $R^3$ each independently are hydrogen, or substituted or unsubstituted alkyl or taken together with the two nitrogen atoms to which they are attached and bridging member B are piperazino; and B is a member selected from the group consisting of —$(CH_2)_n$—, —$CH_2Ar$—$CH_2$—, —$CH_2$—$CH$=$CH$—$CH_2$—,

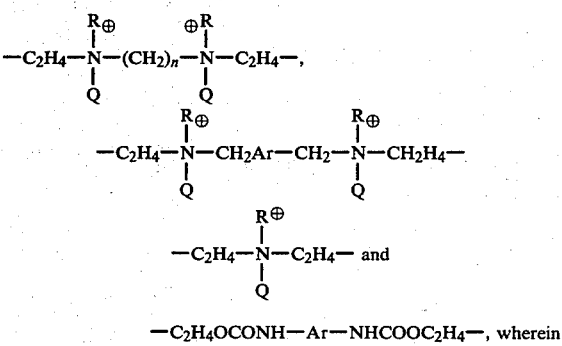

—$C_2H_4OCONH$—$Ar$—$NHCOOC_2H_4$—, wherein Ar is phenylene, diphenylene or naphthylene each of which is unsubstituted or substituted by chlorine, methyl or methoxy, n is an integer from 2 to 8, Q is methyl, ethyl or benzyl and R is as defined above, and $X^\ominus$ is an anion.

2. The dye of claim 1, wherein said dye has the formula:

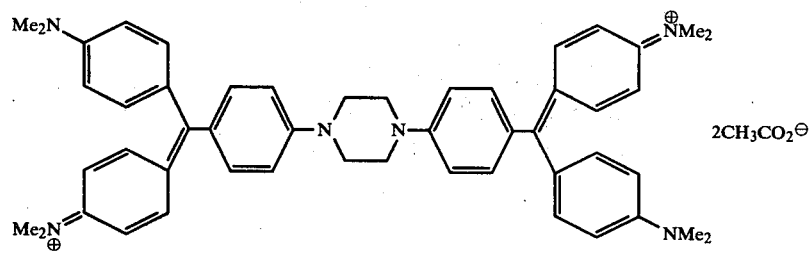
3. The dye of claim 1, wherein said dye has the formula:
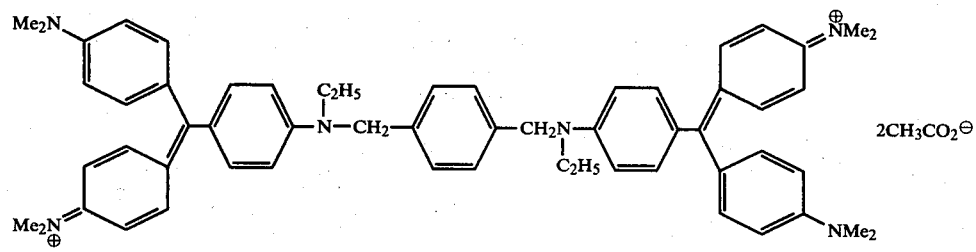
4. The dye of claim 1, wherein said dye has the formula:
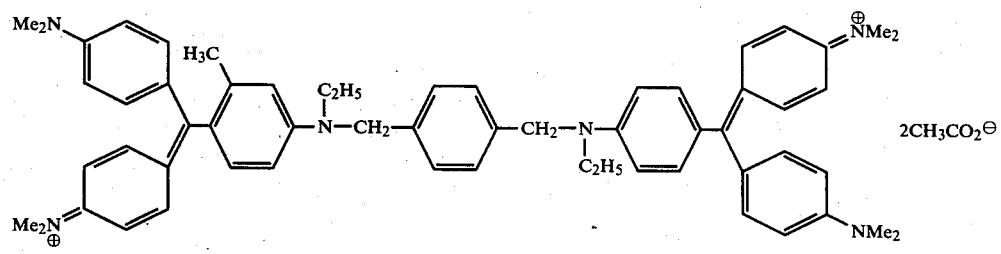
5. The dye of claim 1, wherein said dye has the formula:
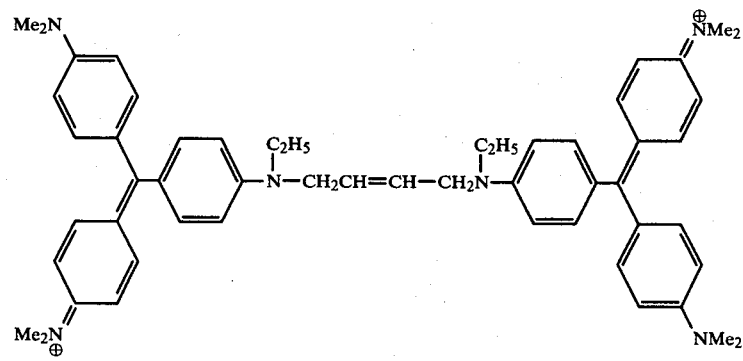
6. The dye of claim 1, wherein said dye has the formula:

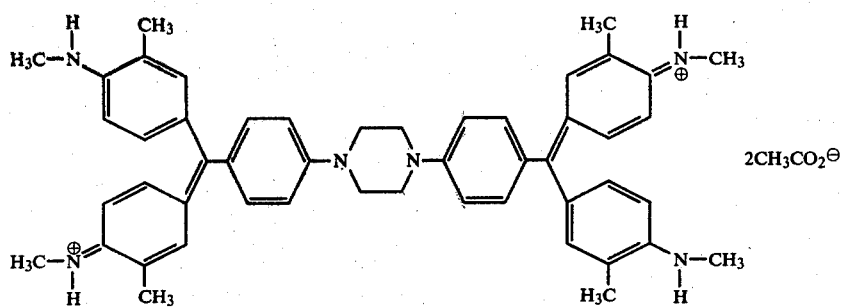
7. The dye of claim 1, wherein said dye has the formula:
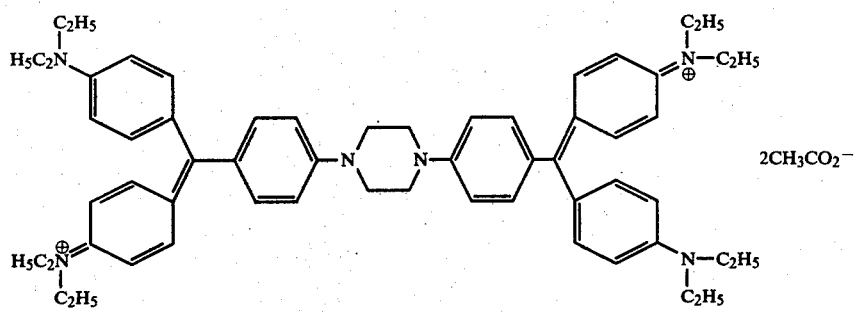
8. The dye of claim 1, of the formula:
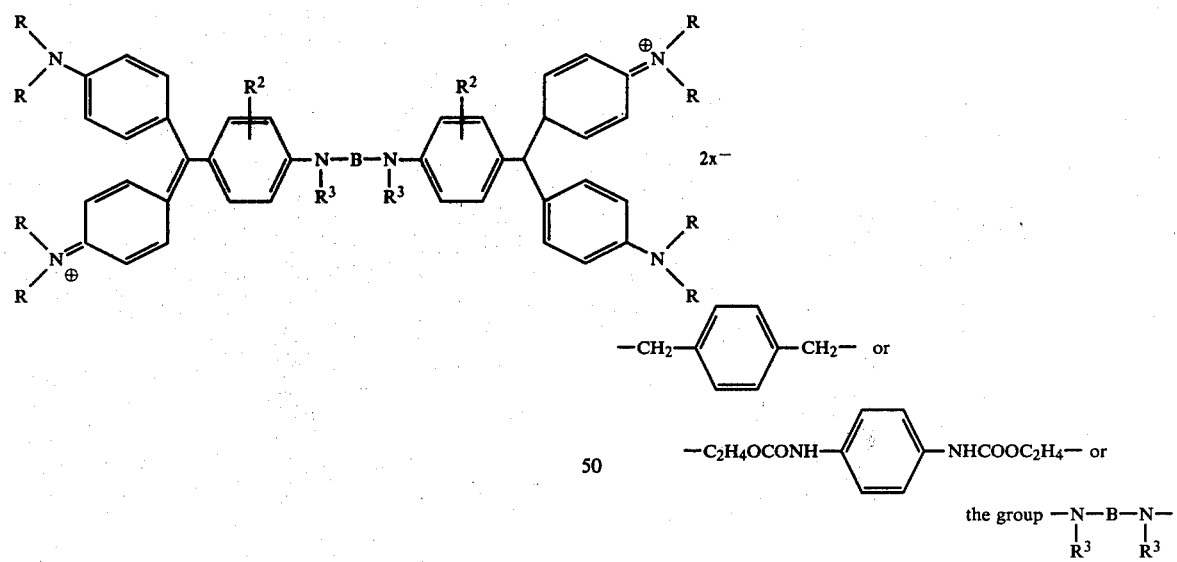
wherein radicals R are each methyl or ethyl; radicals $R^2$ are each hydrogen or methyl; and B is $-(CH_2)_n-$, wherein n is an integer from 2 to 6, $-CH_2-\phantom{a}-CH_2-$ or $-C_2H_4OCONH-\phantom{a}-NHCOOC_2H_4-$ or the group $-N(R^3)-B-N(R^3)-$ is piperazino.
* * * * *